(12) United States Patent
Suzuki et al.

(10) Patent No.: US 6,737,104 B2
(45) Date of Patent: May 18, 2004

(54) MANUFACTURING METHOD OF ANTI-CORROSIVE MULTI-LAYERED STRUCTURE MATERIAL

(75) Inventors: Yukihiro Suzuki, Toyota (JP); Keiji Hashimoto, Aichi-gun (JP); Yoshinari Minamihama, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 109 days.

(21) Appl. No.: 10/230,177

(22) Filed: Aug. 29, 2002

(65) Prior Publication Data

US 2003/0044540 A1 Mar. 6, 2003

(30) Foreign Application Priority Data

Aug. 29, 2001 (JP) ........................................ 2001-259664

(51) Int. Cl.[7] .............................. B05D 1/36; B05D 5/12
(52) U.S. Cl. ....................................... 427/115; 427/404
(58) Field of Search ................................ 427/115, 404, 427/437, 443.1

(56) References Cited

U.S. PATENT DOCUMENTS 6,291,094 B1 * 9/2001 Yoshimura et al. ........... 429/34

FOREIGN PATENT DOCUMENTS

| JP | 04187779 | 11/1990 |
|---|---|---|
| JP | 06228762 | 2/1993 |
| JP | 10147884 | 11/1996 |

* cited by examiner

*Primary Examiner*—Michael Barr

(57) ABSTRACT

A manufacturing method of an anti-corrosive multi-layered structure material having an anti-corrosive non-metallic surface layer formed on a metallic substrate layer, wherein non-electrolytic plating of an anti-corrosive metal different in ionization property from the surface metal of the metallic substrate layer is carried out on the surface of the non-metallic surface layer so that the anti-corrosive metal is substituted for the surface metal of the metallic substrate layer through fine pores of the non-metallic surface layer and precipitated only in the fine pores of the non-metallic surface layer without causing useless precipitation of the anti-corrosive metal on the surface of the non-metallic surface layer.

5 Claims, 2 Drawing Sheets

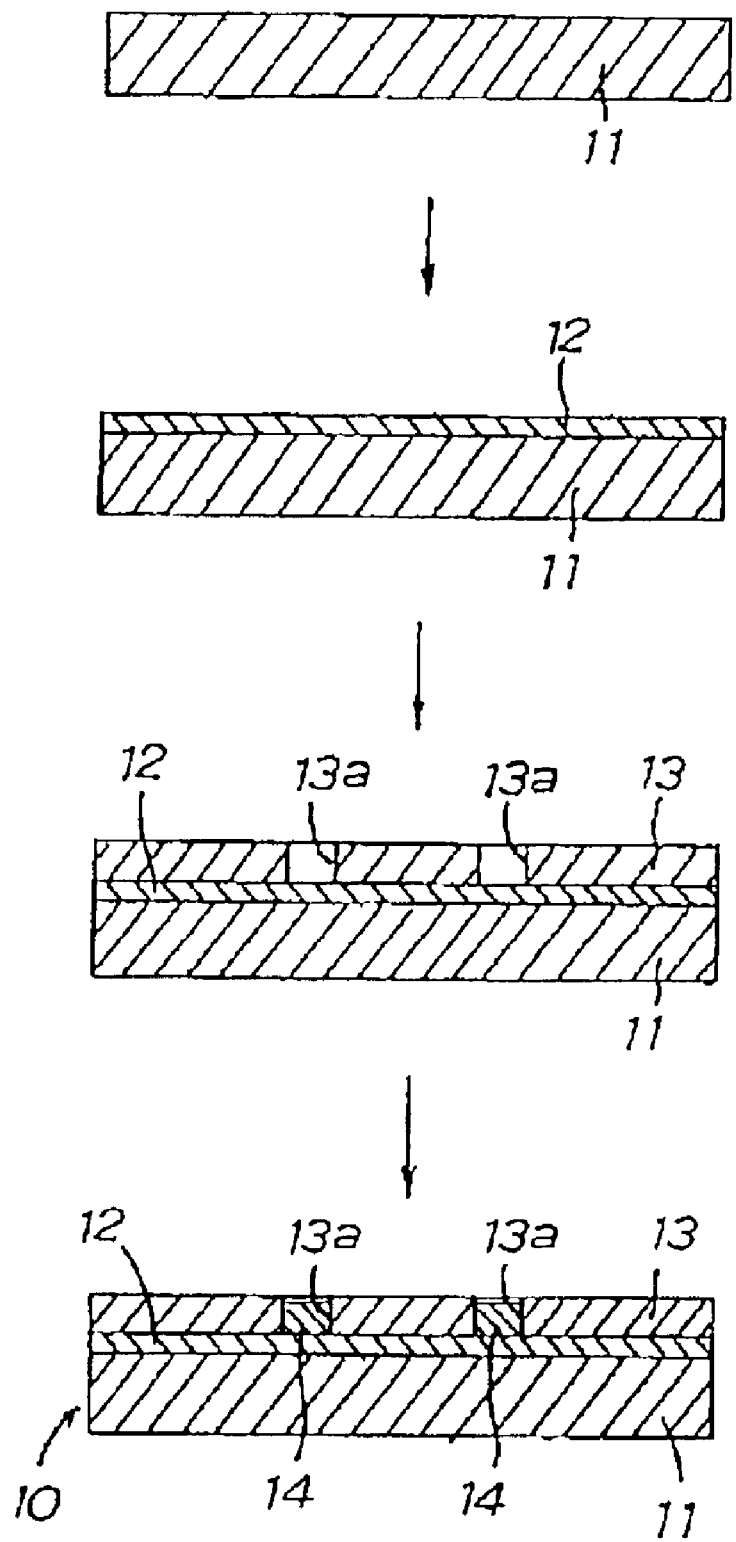

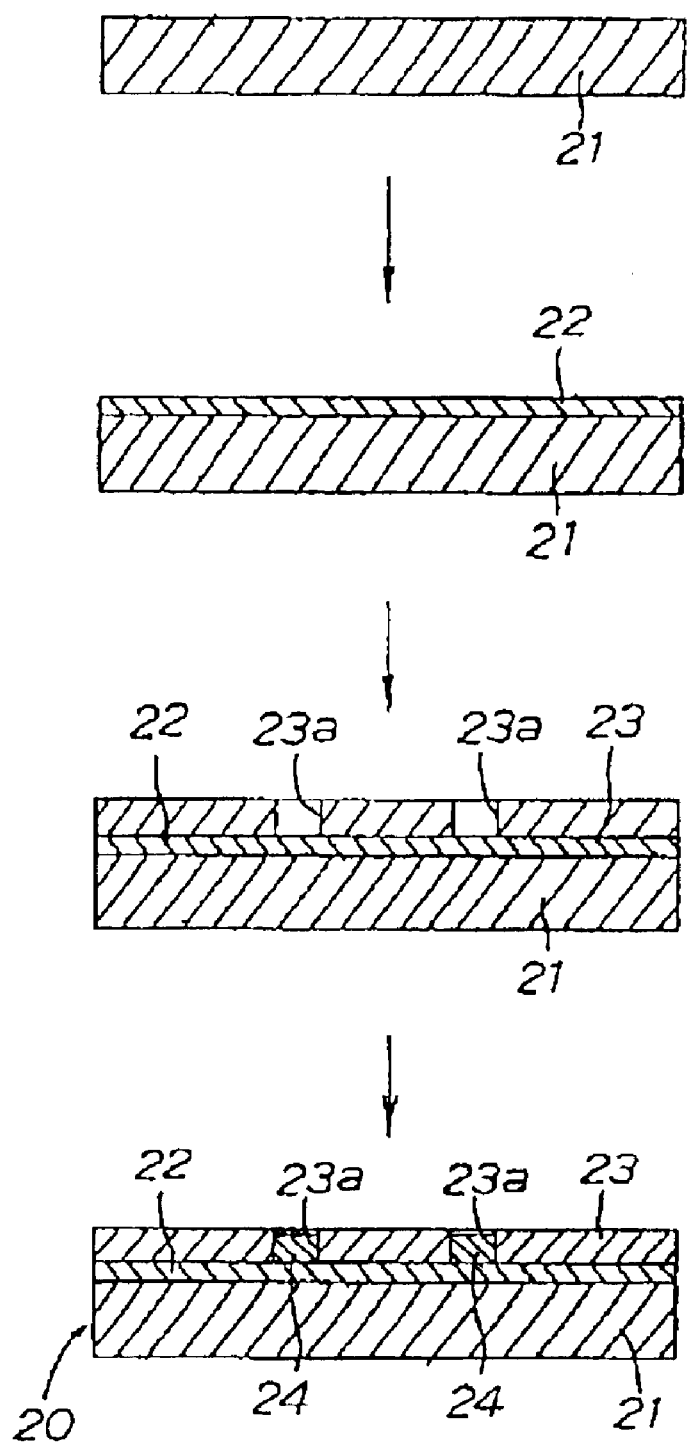

MANUFACTURING METHOD OF ANTI-CORROSIVE MULTI-LAYERED STRUCTURE MATERIAL

BACKGROUND OF THE INVENTION

1. Field of the Invention

The present invention relates to a manufacturing method of an anti-corrosive multi-layered structure material having an anti-corrosive non-metallic surface layer formed on a metallic substrate layer.

2. Discussion of the Prior Art

An anti-corrosive multi-layered structure material having an anti-corrosive non-metallic surface layer formed on a metallic substrate layer can be manufactured in the form of a light weight material at a low cost in comparison with an anti-corrosive metallic material made of a high-nickel chromium alloy. The multi-layered structure material is used as a material of various kinds of structures in a corrosive atmosphere.

In the anti-corrosive multi-layered structure material, an inexpensive metallic material inferior in anti-corrosiveness is used as a material of the metallic substrate layer, and various kinds of fine ceramic powder or fine carbon powder is used as a component material of the non-metallic surface layer. The fine ceramic powder or fine carbon powder is layered on the metallic substrate layer by coating, sputtering or electrophoresis method. As a result, numberless fine pores are formed in the non-metallic surface layer of the structure material and opened into the non-metallic surface layer from the surface of the metallic substrate layer. Accordingly, in use of the anti-corrosive multi-layered structure material in a corrosive atmosphere, the metallic substrate layer is corroded due to corrosive liquid or gas invaded into the fine pores in the corrosive atmosphere, and the non-metallic surface layer is peeled off from the surface of the metallic substrate layer.

To ensure anti-corrosiveness of the multi-layered structure material, it is required to fill up the numberless pores inevitably formed in the non-metallic surface layer during the manufacturing process. In Japanese Patent Laid-open Publication No. 4-187779, there is disclosed a treatment method of filling up the numberless pores in the non-metallic surface layer by non-electrolytic plating of anti-corrosive metal. Disclosed also in Japanese Patent Laid-open Publication No. 6-228762 is a treatment method of filling up the numberless pores in a non-metallic surface layer of another type by non-electrolytic plating of gold superior in anti-corrosiveness.

As in the treatment methods disclosed in the publications, selection of the metal used for non-electrolytic plating depends only on control of a temperature, it is difficult to plate only the interior of pores with the selected metal without plating useless portions of the surface of the multi-layered structure material. Since the anti-corrosive metal such as gold used for non-electrolytic plating is expensive in comparison with the metal used for the metallic substrate layer, the treatment cost of the surface of the multi-layered structure material increases.

In the treatment method disclosed in the Japanese Patent Laid-open Publication No. 6-228762, the non-electrolytic plating of gold is carried out on the entire surface of an intermediate layer in the form of a special metal plated skin membrane or a strike skin membrane formed on the surface of the metallic substrate layer. This results in extreme increase of the treatment cost of the surface of the multi-layered structure material.

SUMMARY OF THE INVENTION

It is, therefore, a primary object of the present invention to provide a manufacturing method of an anti-corrosive multi-layered structure material capable of filling up only fine pores in a non-metallic surface layer formed on a metallic substrate layer at a low cost.

According to the present invention, the object is attained by providing a manufacturing method of an anti-corrosive multi-layered structure material having an anti-corrosive non-metallic surface layer formed on a metallic substrate layer, wherein non-electrolytic plating of an anti-corrosive metal different in ionization property from the surface metal of the metallic substrate layer is carried out on the surface of the non-metallic surface layer so that the anti-corrosive metal is substituted for the surface metal of the metallic substrate layer through fine pores of the non-metallic surface layer and precipitated only in the fine pores of the non-metallic surface layer without causing any precipitation of the anti-corrosive metal on a useless portion of the non-metallic surface layer.

According to an aspect of the present invention, there is provided a manufacturing method of the anti-corrosive multi-layered structure material, wherein non-electrolytic plating of an anti-corrosive metal catalytic with the surface metal of the metallic substrate layer is carried out on the surface of the non-metallic surface layer so that the anti-corrosive metal catalyzes with the surface metal of the metallic substrate layer through fine pores of the non-metallic surface layer and precipitated only in the fine pores of the non-metallic surface layer without causing any precipitation of the anti-corrosive metal on a useless portion of the non-metallic surface layer.

In the manufacturing methods described above, the non-metallic surface layer is provided in the form of a carbon layer or a conductive ceramic layer, and the anti-corrosive multi-layered structure material can be used as a separator in a fuel cell. In a practical embodiment of the present invention, the non-metallic surface layer may be provided in the form of a carbon layer or a conductive ceramic layer of TiN or TiC to provide a light weight separator superior in anti-corrosiveness for use in a fuel cell. In the case that the non-metallic surface layer is provided in the form of a carbon layer, the surface treatment of the metallic substrate layer can be carried out at a low cost. Accordingly, the anti-corrosive multi-layered structure material can be provided as a useful material for a separator used in a corrosive environment of a fuel cell.

In the case that the anti-corrosive multi-layered structure material is used in a high temperature corrosive atmosphere, it is desirable to provide a non-metallic surface layer made of heat resistant ceramic such as $SiO_2$, $Al_2O_3$ or the like. In the case that the anti-corrosive multi-layered structure material is used in a low temperature corrosive atmosphere, it is desirable to provide a non-metallic surface layer made of anti-corrosive synthetic resin such as polyethylene, polypropylene, terafluoroethylene or the like.

BRIEF DESCRIPTION OF THE DRAWINGS

Other objects, advantages and features of the present invention will be more readily appreciated from the following detailed description of preferred embodiments thereof when taken together with the accompanying drawings, in which:

FIG. 1 illustrates a manufacturing process of an anti-corrosive multi-layered structure material in a first embodiment of the present invention; and FIG. 2 illustrates a manufacturing process of an anti-corrosive multi-layered structure material in a second embodiment of the present invention.

DESCRIPTION OF PREFERRED EMBODIMENTS

In a first preferred embodiment of a manufacturing method of an anti-corrosive multi-layered structure material in accordance with the present invention, non-electrolytic plating of an anti-corrosive metal different in ionization property from a surface metal of a metallic substrate layer is carried out on the surface of the substrate layer so that an anti-corrosive metal is substituted for the surface metal of the substrate layer through fine pores of the non-metallic surface layer and precipitated only in the fine pores of the non-metallic layer to fill up the fine pores.

Hereinafter, a practical embodiment of the manufacturing method will be described with reference to FIG. 1. In this manufacturing method, a stainless steel plate 11 was used as a metallic substrate layer of the anti-corrosive multi-layered structure material 10, and a skin membrane 12 of nickel was formed on the surface of the metallic substrate layer 11 by nickel plating. To form an anti-corrosive non-metallic layer 13 on the surface of the nickel skin membrane 12, carbon paint was coated on the surface of the nickel skin membrane 12 to form a carbon layer as the non-metallic layer 13. In such a condition, non-electrolytic plating of gold was conducted on the surface of the non-metallic layer made of carbon.

During the non-electrolytic plating, the gold was substituted for a portion of nickel of the skin membrane 12 due to difference in ionization therewith through fine pores 13a inevitably formed in the non-metallic layer 13 and precipitated in the fine pores. As a result, a portion of gold 14 in the non-electrolytic plating bath was filled up only in the fine pores 13 without causing any precipitation on a useless portion of the surface of the non-metallic layer 13.

In the manufacturing process of the anti-corrosive multi-layered structure material, the thickness of the nickel skin membrane 12 was 4–5 $\mu$m, the thickness of the non-metallic layer 13 was 30 $\mu$m, and the diameter of the fine pores 13a was in an extent of 0.05–0.1 $\mu$m.

In the manufacturing process of the anti-corrosive multi-layered structure material, the nickel skin membrane 12 may be formed by sputtering or vacuum deposition in substitution for the nickel plating. Alternatively, in the case that metallic substrate layer 11 is formed of a nickel plate or a nickel steel plate, the formation of the nickel skin membrane 12 may be eliminated. In addition, the non-metallic surface layer 13 may be formed by sputtering or electrophresis in substitution for the coating of carbon paint.

In a second preferred embodiment of a manufacturing method of an anti-corrosive multi-layered structure material in accordance with the present invention, non-electrolytic plating of an anti-corrosive metal catalytic with the surface of a metallic substrate layer is conducted on the surface of a non-metallic surface layer so that the anti-corrosive metal catalyzes with the surface metal of the metallic substrate layer through fine pores of the non-metallic surface layer and is precipitated only the fine pores of the non-metallic surface layer to fill up the fine pores.

Illustrated in FIG. 2 is a practical embodiment of the second manufacturing method, wherein a stainless steel plate was used as a metallic substrate layer 21 of an anti-corrosive multi-layered structure material and an extreme thin skin membrane 22 of gold was formed on the surface of the metallic substrate layer 21 by electric plating. To form an anti-corrosive non-metallic surface layer 23 on the surface of the skin membrane 22 of gold, carbon paint was coated on the surface of the skin membrane 22 to form a carbon layer as the non-metallic surface layer 23. In such a condition, non-electrolytic plating of gold was carried out on the surface of the non-metallic layer made of carbon.

During the non-electrolytic plating, the gold grew on the surface of the extreme thin skin membrane 22 through fine pores 23a inevitably formed in the non-metallic surface layer 23 and was precipitated in the fine pores. As a result a portion of gold in the non-electrolytic plating bath was filled up only in the fine pores 23a without causing any precipitation of gold on a useless portion of the surface of the non-metallic surface layer 23.

In the manufacturing process of the anti-corrosive multi-layered structure material, the thickness of the gold thin membrane 22 was 0.01 $\mu$m, the thickness of the non-metallic surface layer 23 of carbon was 30 $\mu$m, and the diameter of the fine pores 23a was 0.05–0.10 $\mu$m.

In the manufacturing process of the anti-corrosive multi-layered structure material, the gold skin membrane 12 may be formed by sputtering or vacuum deposition in substitution for the electrolytic plating of gold. In addition, the non-metallic surface layer 13 may be formed by sputtering or electrophresis in substitution for the coating of carbon paint.

What is claimed is:

1. A manufacturing method of an anti-corrosive multi-layered structure material having an anti-corrosive non-metallic surface layer formed on a metallic substrate layer, wherein non-electrolytic plating of an anti-corrosive metal different in ionization property from the surface metal of the metallic substrate layer is carried out on the surface of the non-metallic, surface layer so that the anti-corrosive metal is substituted for the surface metal of the line metallic substrate layer through fine pores of the non-metallic surface layer and is precipitated only in the fine pores of the non-metallic surface layer.

2. A manufacturing method of an anti-corrosive multi-layered structure material having an anti-corrosive non-metallic surface layer formed on a metallic substrate layer, wherein non-electrolytic plating of an anti-corrosive metal catalytic with the surface metal of the metallic substrate layer is earned out on the surface of the non-metallic surface layer so that the anti-corrosive metal catalyzes with the surface metal of the metallic substrate layer through fine pores of the non-metallic surface layer and precipitated only in the fine pores of the non-metallic surface layer.

3. A manufacturing method of an anti-corrosive multi-layered structure material as claimed in claim 1, wherein the surface of the metallic substrate layer is formed with a metallic skin membrane of a metal different in ionization property from the anti-corrosive metal for non-electrolytic plating.

4. A manufacturing method of an anti-corrosive multi-layered structure material as claimed in claim 2, wherein the surface of the metallic substrate layer is formed with a metallic skin membrane catalytic with the anti-corrosive metal for non-electrolytic plating.

5. A manufacturing method of an anti-corrosive multi-layered structure material as claimed in claim 1, wherein the non-metallic surface layer is provided in the form of a carbon layer or a conductive ceramic layer, and wherein the anti-corrosive multi-layered structure material is provided to be used as a separator in a fuel cell.

* * * * *